United States Patent
Kim et al.

(10) Patent No.: US 8,217,905 B2
(45) Date of Patent: Jul. 10, 2012

(54) METHOD AND APPARATUS FOR TOUCHSCREEN BASED USER INTERFACE INTERACTION

(75) Inventors: Jung-geun Kim, Suwon-si (KR); Bo-eun Park, Seongnam-si (KR); Jong-sung Joo, Seongnam-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 1271 days.

(21) Appl. No.: 11/941,261

(22) Filed: Nov. 16, 2007

(65) Prior Publication Data

US 2008/0297483 A1    Dec. 4, 2008

(30) Foreign Application Priority Data

May 29, 2007    (KR) ........................ 10-2007-0052223

(51) Int. Cl.
*G09G 5/08*    (2006.01)
(52) U.S. Cl. .......................... 345/173; 715/716; 715/728

(58) Field of Classification Search .......... 345/156–158, 345/173–179; 715/716, 727–729; 178/18.01–18.11; 340/4.1, 4.14
See application file for complete search history.

(56) References Cited

U.S. PATENT DOCUMENTS

| 6,940,494 B2 * | 9/2005 | Hoshino et al. ............... 345/173 |
| 2007/0146341 A1 * | 6/2007 | Medler et al. ................ 345/173 |
| 2009/0051660 A1 * | 2/2009 | Feland et al. ................ 345/173 |

* cited by examiner

*Primary Examiner* — Regina Liang
(74) *Attorney, Agent, or Firm* — Stanzione & Kim LLP

(57) ABSTRACT

A method and apparatus for a touchscreen based user interface (UI) interaction that controls a volume through circular UI graphics and switches between different application images by dragging an indicator on a touchscreen of a terminal device. The method includes: displaying an application image on a touchscreen; sensing whether the touchscreen is touched on the displayed application image; if the touchscreen is touched, displaying a volume image to control an audio volume at a touch position; and changing a size of the volume image whenever the touchscreen is touched and controlling the audio volume to corresponding to the size of the volume region.

16 Claims, 6 Drawing Sheets

FIG. 5A
FIG. 5B
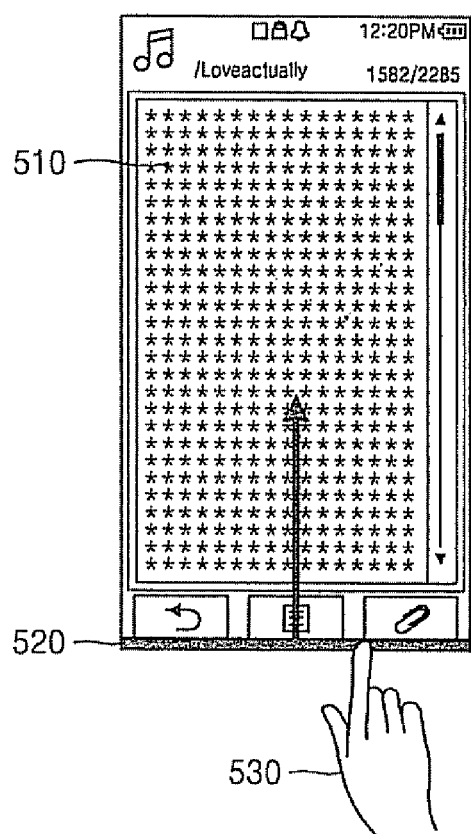
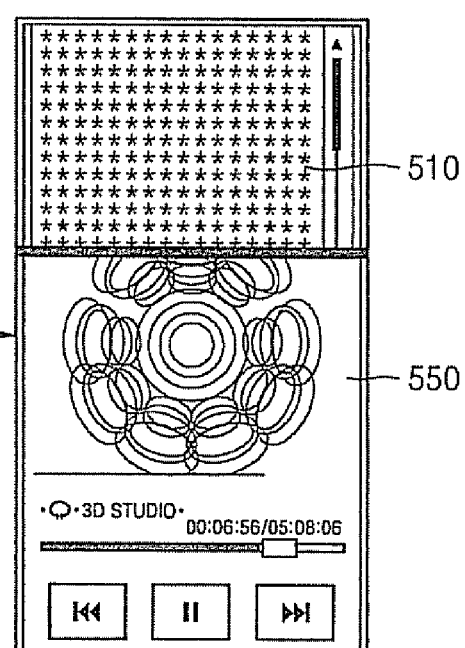

METHOD AND APPARATUS FOR TOUCHSCREEN BASED USER INTERFACE INTERACTION

CROSS-REFERENCE TO RELATED APPLICATION

This application claims the benefit of Korean Application No. 2007-52223, filed on May 29, 2007 in the Korean Intellectual Property Office, the disclosure of which is incorporated herein by reference.

BACKGROUND OF THE INVENTION

1. Field of the Invention

Aspects of the present invention relate to a method and apparatus for touchscreen based user interface (UI) interaction, and more particularly, to a method and apparatus for UI interaction that includes a volume control by using circular UI graphics and a switching between different application images by dragging an indicator on a touchscreen of a multimedia terminal device.

2. Description of the Related Art

Multimedia content players having touchscreens (such as personal computers (PCs), personal digital assistants (PDAs), portable multimedia players (PMPs), and MPEG Audio Layer III (MP3) players) are widely popular. A multimedia content player provides a variety of types of contents, including images and audio signals. A touchscreen is an input/output device supplementing or substituted for a keyboard, a mouse, and/or other input devices. A user operates the multimedia content player by directly touching the touchscreen with, for example, a finger or a stylus pen. By using different touching gestures, a plurality of functions (such as reproduction, stop, pause, fast forward, volume up, volume down, file transference, enlargement, reduction, file navigation, and image rotation) may be performed on multimedia contents.

FIG. 1 is an external view illustrating a method of controlling audio volume in a conventional multimedia content player. Referring to FIG. 1, (−) and (+) graphic buttons are displayed on a screen from which volume is controlled. The (−) and (+) graphic buttons are operated when they are pushed like other touch buttons. For example, a user may control an audio volume by pushing each of the (−) and (+) graphic buttons. In this case, when the (−) and (+) graphic buttons are pushed for a long time, corresponding functions may be performed repeatedly.

However, a conventional touchscreen based multimedia content player may not take full advantage of a touchscreen and/or may not operate the multimedia content player while, for example, the multimedia content player is in a pocket because the stationary buttons may only be manipulated by viewing the touchscreen.

Also, the touchscreen of the conventional multimedia content player provides a single-point based dragging interaction by using a single finger. However, the single-point based dragging interaction may not perform a number of functions on a display unit having a limited size.

Furthermore, the conventional touchscreen based multimedia content player only switches between different applications by using a main menu (or a home menu). For example, when a user views text and wants to control audio volume on a multimedia content player, the user must return to a main menu in order to view audio volume options.

SUMMARY OF THE INVENTION

Aspects of the present invention provide a method and apparatus for touchscreen based user interface (UI) interaction that controls a volume by using circular UI graphics and switches between different application images by dragging an icon on a touchscreen of a terminal device.

According to an aspect of the present invention, there is provided a method for a touchscreen based UI interaction, the method including: displaying an application image on a touchscreen; sensing whether the touchscreen is touched on the displayed application image; if the touchscreen is touched, displaying a volume image to control an audio volume at a touch position; and changing a size of the volume image whenever the touchscreen is touched and controlling the audio volume to correspond to the size of the volume region.

According to another aspect of the present invention, there is provided a method for touchscreen based UI interaction, the method including: setting an icon at a first position of a touchscreen in order to switch a first application image currently displayed on the touchscreen to a second application image that is different from the first application image; sensing a dragged touch starting from the icon and stopping at a second position of the touchscreen; and overlaying the second application image on the first application image such that the second application image is displayed from the first position to the second position.

According to another aspect of the present invention, there is provided a multimedia terminal device including: a touchscreen unit to display an application image and to display a volume image that corresponds to an audio volume of the device; a memory unit to store digital multimedia contents and predetermined volume information corresponding to a plurality of operation modes; and a control unit to display the volume image at a touch position when the touchscreen unit is touched on the application image, to change a size of the volume image whenever the touchscreen unit is touched, and to control the audio volume so as to correspond to the size of the volume image.

According to yet another aspect of the present invention, there is provided a multimedia terminal device including: a touchscreen unit to display an icon, a first application image, and a second application image that is different from the first application image; and a control unit to set the icon at a first position of the touchscreen unit, to sense a dragged touch staring from the icon and stopping at a second position of the touchscreen unit, and to overlay the second application image on the first application image such that the touchscreen unit displays the second application image from the first position to the second position.

According to still another aspect of the present invention, there is provided a method for a touchscreen based user interface (UI) interaction on a processing device, the method including: sensing whether a touchscreen of the processing device is touched; displaying a function image to control a function of the processing device at a touch position if the touchscreen is touched; and changing a size of the function image if the touchscreen is touched and controlling the function according to the size of the volume image.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 5A and 5B and FIGS. 6A through 6C are views illustrating an example of touchscreen based UI interaction when multiple tasks are performed according to another embodiment of the present invention.

DETAILED DESCRIPTION OF THE EMBODIMENTS

Figure 1:
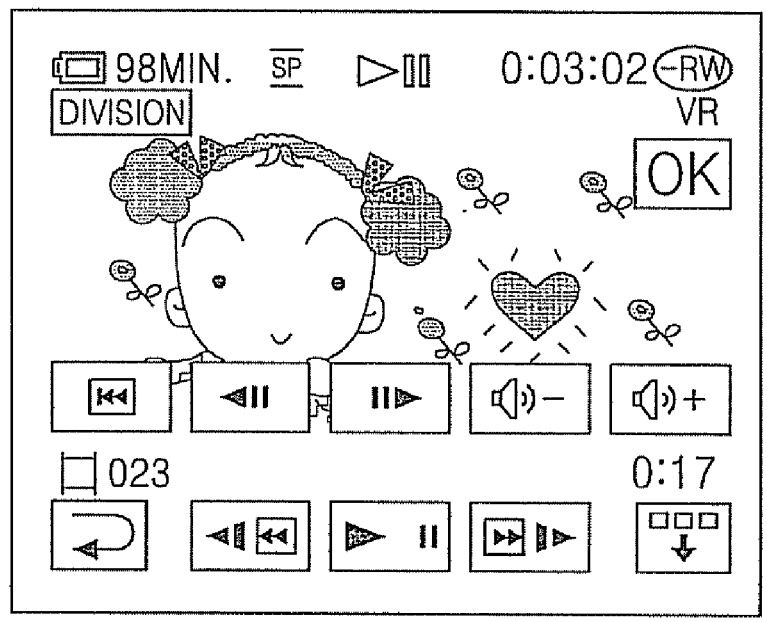
FIG. 1 is an external view illustrating a method of controlling audio volume in a conventional multimedia content player.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
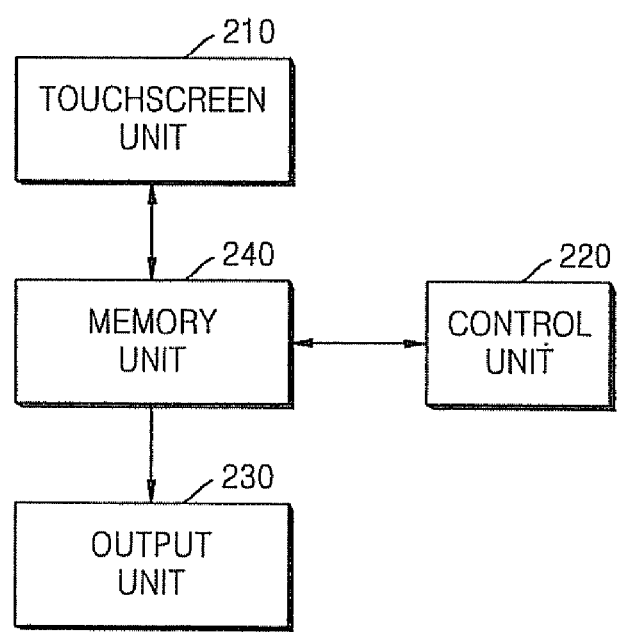
FIG. 2 is a block diagram of a multimedia terminal device to which a method and apparatus for a touchscreen based user interface (UI) interaction are applied according to an embodiment of the present invention.

FIG. 2 is a block diagram of a multimedia terminal device to which a method and apparatus for a touchscreen based user interface (UI) interaction are applied according to an embodiment of the present invention. Referring to FIG. 2, the multimedia terminal device includes a touchscreen unit 210, a control unit 220, an output unit 230, and a memory unit 240.

The touchscreen unit 210 displays an image and senses a touching and/or a drag touching (i.e., a simultaneous touching and movement across a surface of the touchscreen unit 210) by a user using, for example, a sensor that reacts to pressure applied to a surface of the touchscreen unit 210. Furthermore, the touchscreen unit 210 displays UI graphics (such as circular UI graphics) and/or a multitasking screen. Here, the touchscreen unit 210 may sense the touching and/or drag touching by using a pressure method and/or a capacitance method.

The memory unit 240 stores predetermined screen information and UI information corresponding to a plurality of operation modes as well as multimedia contents. According to an aspect of the present invention, the UI information may be displayed as graffiti, icons, and/or buttons that correspond to the operation modes, although not limited thereto.

The output unit 230 reproduces the multimedia contents as audio/video (AV) signals by using a screen and/or a speaker.

The control unit 220 recognizes instructions resulting from a manipulation of the touchscreen unit 210, controls the reproduction of the multimedia contents, and displays and/or reproduces the multimedia contents stored in the memory unit 240 through the touchscreen unit 210 or the output unit 230. In particular, the control unit 220 may display a signal reproduction image (i.e., an application image) on the touchscreen unit 210, sense a touching on the displayed signal reproduction image, display a predetermined volume region (i.e., volume image) at a touch position if the touching is sensed, change a size of the volume region, and control audio volume so as to correspond to the size of the volume region.

However, it is understood that aspects of the present invention are not limited to a volume region and controlling an audio volume. For example, the control unit 220 may display a contrast region to control a display contrast of the output unit 230, a brightness region to control a brightness of the output unit 230, or a file explorer region to control a contents selection to be reproduced.

According to another embodiment of the present invention, the control unit 220 sets an indicator (i.e., icon) that switches a current application image to another application image at a predetermined position, and overlays the other application image on the current application image by sensing a drag touching starting from the indicator. The other application image is overlaid so as to correspond to a dragged distance.

Figure 3D:
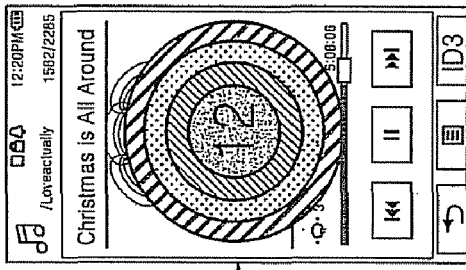
FIGS. 3A through 3F are views illustrating an example of a touchscreen based UI interaction when volume controls are performed according to an embodiment of the present invention.
Figure 3C:
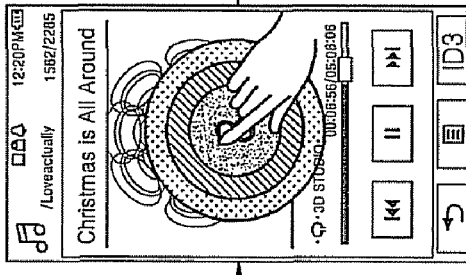
Figure 3B:
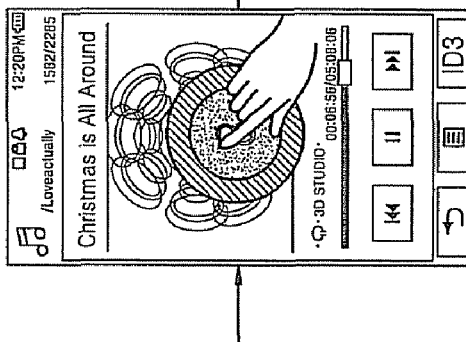
Figure 3A:
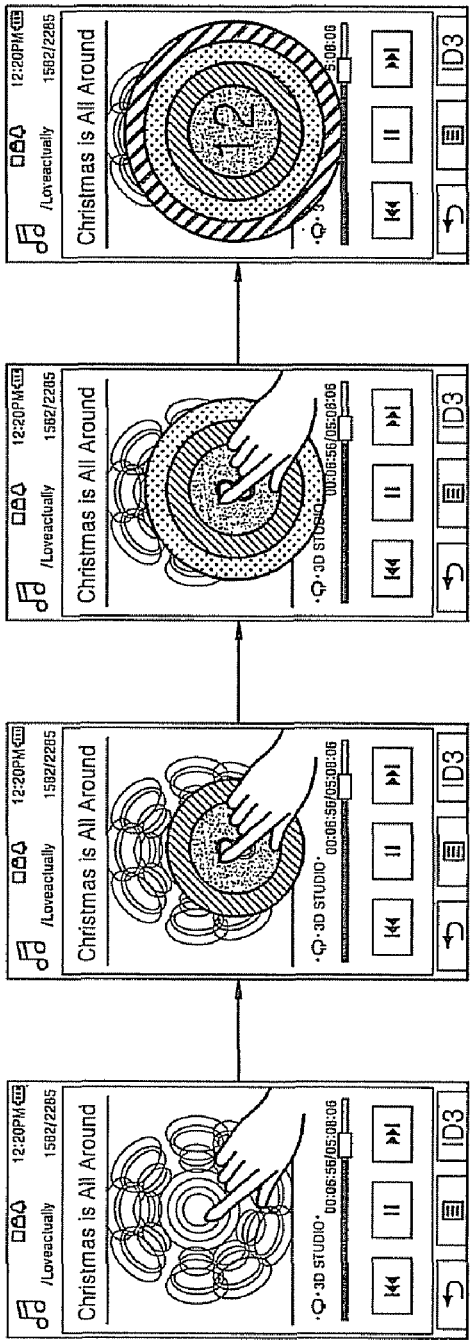

FIGS. 3A through 3F are views illustrating an example of a touchscreen based UI interaction when volume control is performed according to an embodiment of the present invention. Referring to FIGS. 3A and 3B, if a user touches a music reproduction image once (as illustrated in FIG. 3A), a volume region graphic having a circular shape is generated (as illustrated in FIG. 3B). For example, the size of the circular shape may be 3 units of size measurement, corresponding to a volume of 3 units of audio measurement.

If the user touches an inside of the circular shape displayed on a touchscreen as illustrated in FIG. 3B, the size of the circular shape increases from 3 units of size measurement to 8 units of size measurement corresponding to a volume increase from 3 units of audio measurement to 8 units of audio measurement, as illustrated in FIG. 3C. It is understood that an increase and decrease in the size measurement is not necessarily directly proportional to an increase and decrease in the audio measurement. If the user retouches the inside of the circular shape displayed on the touchscreen as illustrated in FIG. 3C, the size of the circular shape increases from 8 units of size measurement to 12 units of size measurement corresponding to a volume increase from 8 units of audio measurement to 12 units of audio measurement, as illustrated in FIG. 3D.

Figure 3F:
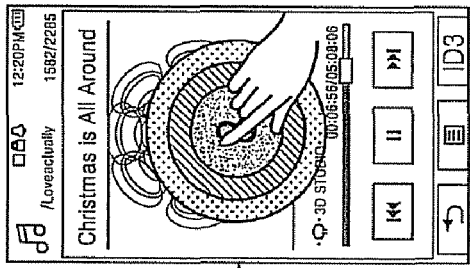
Figure 3E:
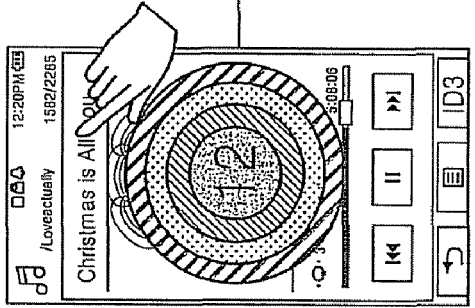

However, if the user touches an outside of the circular shape displayed on the touchscreen, as illustrated in FIG. 3E, the size of the circular shape decreases from 12 units of size measurement to 8 units of size measurement corresponding to a volume decrease from 12 units of audio measurement to 8 units of audio measurement, as illustrated in FIG. 3F.

As the size of the volume region graphic increases or decreases, audio volume also increases or decreases. It is understood that a graphic other than a circular shape may be used as the volume region graphic. It is further understood that no graphic at all may be used. It is further understood that the touchscreen based UI interaction to control volume can be applied to screens other than the music reproduction image. For example, such an interaction can be applied during a reproduction of a movie, or to control background audio while another application (such as a text-based application) is being executed.

Figure 4:
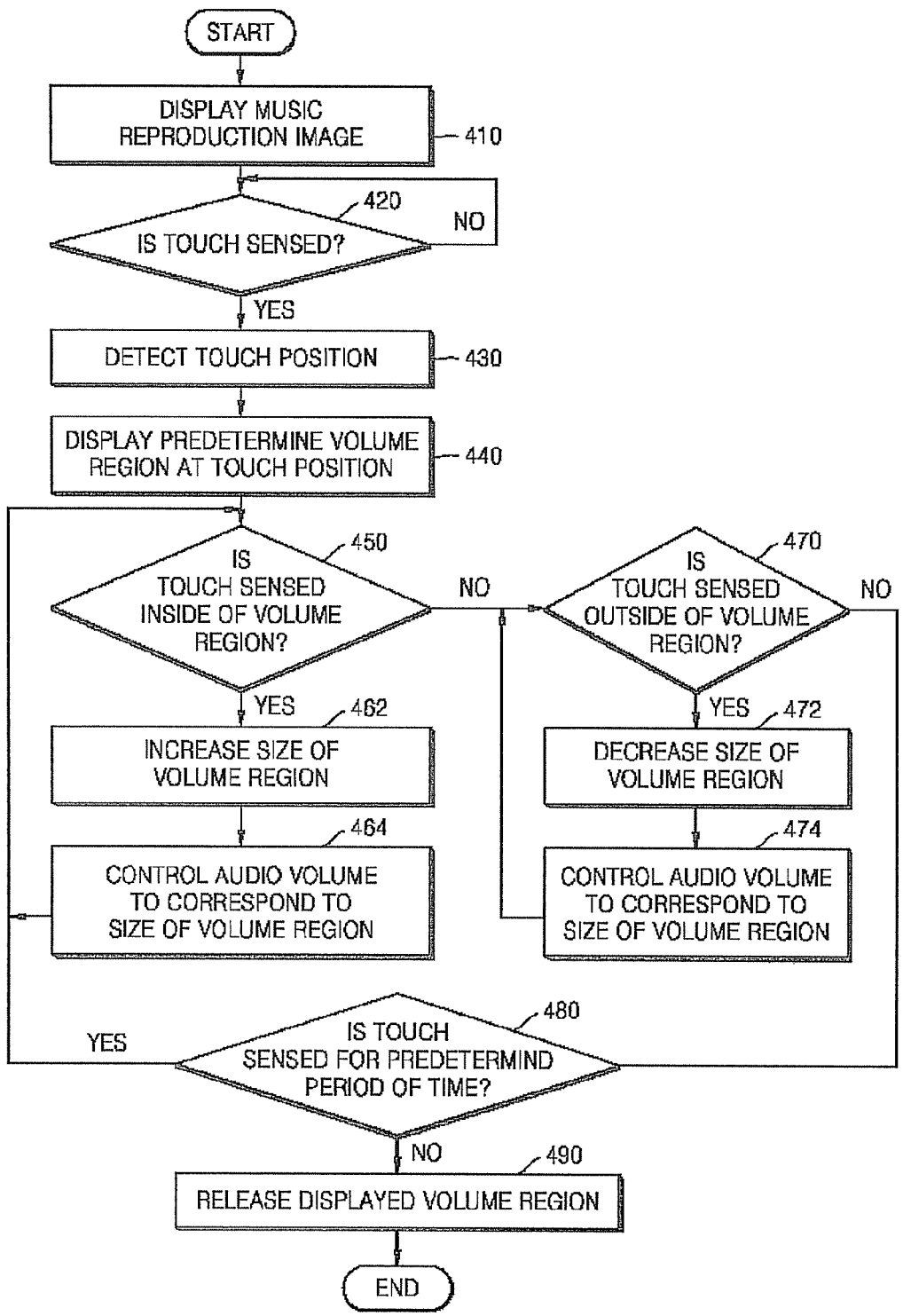
FIG. 4 is a flowchart of a method of controlling audio volume on a touchscreen illustrated in FIG. 3, according to an embodiment of the present invention.

FIG. 4 is a flowchart of a method of controlling audio volume on the touchscreen illustrated in FIG. 3, according to an embodiment of the present invention. Referring to FIG. 4, a music reproduction image (i.e., a music application image) of a music file selected by a user is displayed on the touchscreen in operation 410. Here, the music reproduction image is previously stored so as to correspond to an operation mode of a device.

When an object (such as a stylus pen or one or more fingers) touches a certain region of the touchscreen, the touching by the object is sensed by, for example, a touch sensor in operation 420.

A touch position is detected by calculating x and y coordinates of the touch in operation 430.

A volume region (i.e., volume image) having a predetermined shape is displayed on the touchscreen in order to enable a UI interaction at the touch position in operation 440. In this case, the volume region is displayed so as to overlap the music reproduction image. The volume region may be generated so as to have a circular shape, although not limited thereto.

When the object touches the touchscreen again, a touch position is checked in operation 450.

If the touching is sensed inside of the volume region, the size of the volume region increases in operation 462. For example, if the object touches the touchscreen inside of the circular shape of the volume region, the size of the circular shape increases. Then, the audio volume is controlled so as to be proportional to the size of the volume region in operation 464. However, it is understood that according to other aspects, the change in the audio volume is not necessarily proportional to a change in the size of the volume region. Thus, whenever the touching is sensed inside of the volume region, the size of the volume region increases and the audio volume increases accordingly.

On the other hand, if the touching is sensed outside of the volume region in operation 470, the size of the volume region decreases in operation 472. For example, if the object touches the touchscreen outside of the circular shape of the volume region, the size of the circular shape decreases. Then, the audio volume is controlled so as to be proportional to the size of the volume region in operation 474. However, it is understood that according to other aspects, the change in the audio volume is not necessarily proportional to a change in the size of the volume region. Thus, whenever the touching is sensed outside of the volume region, the size of the volume region decreases and the audio volume decreases accordingly.

Whether the touching is sensed on the touchscreen is checked for a predetermined period of time in operation 480. Specifically, if the touching is sensed on the touchscreen during the predetermined period of time, the audio volume is continuously controlled. However, if the touching is not sensed on the touchscreen during the predetermined period of time, the volume region is removed from the touchscreen in operation 490. However, it is understood that other methods may be used to end a control of the audio volume (i.e., remove the volume region) according to other aspects. For example, a repetitive touching or a drag touching may end the control of the audio volume.

According to another embodiment of the present invention, audio volume may be controlled according to a predetermined angle of dragging sensed on a predetermined volume region overlaid on a signal reproduction image.

According to still another embodiment of the present invention, audio volume may be controlled according to an amount of time an object is pressed on a predetermined volume region overlaid on a signal reproduction image.

FIGS. 5A and 5B and FIGS. 6A through 6C are views illustrating an example of touchscreen based UI interaction when multiple tasks are performed according to another embodiment of the present invention. Referring to FIGS. 5A and 5B, a touchscreen includes a first application image (i.e., a text image 510), a second application image (i.e., a music reproduction image 550), and an indicator 520 (i.e., icon) that can switch between the text image 510 and the music reproduction image 550. Here, the indicator 520 may be set at a predetermined region of the touchscreen (such as a top or a bottom of the touchscreen) and may hide the music reproduction image 550.

If a user 530 drags the indicator 520 provided, for example, at the bottom of the touchscreen in a direction of an arrow as illustrated in FIG. 5B, the music reproduction image 550 is overlaid on the text image 510. In this case, if the user 530 stops the dragging before the indicator 520 reaches the top of the touchscreen, the touchscreen generates a multiple tasking image including both the text image 510 and the music reproduction image 550 (as illustrated in FIG. 5B). Accordingly, the user 530 may operate a plurality of functions (such as fast forward, rewind, and play/pause) on the music reproduction image 550 while the text image 510 is continuously being viewed, instead of having to return to a main menu to control such functions.

Furthermore, according to aspects of the present invention, more than two different applications may be concurrently displayed as an image on the touchscreen instead of being separately divided in accordance with an instruction of the user 530. It is understood that aspects of the present invention may be applied to any application images, and not necessarily a text image 510 and a music reproduction image 550.

Figures 6A, 6B, 6C:
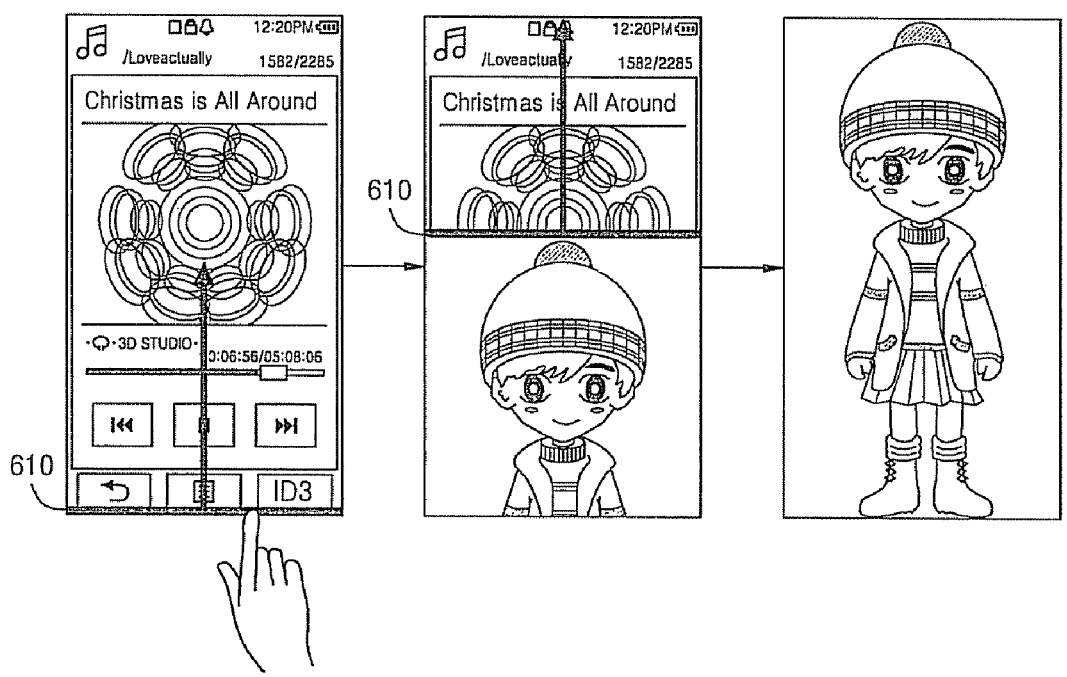

Furthermore, referring to FIGS. 6A through 6C, if a user continuously drags an indicator 610 upward, three different application images are switched in the order of: the text image 510 illustrated in FIG. 5A, a music reproduction image as illustrated in FIG. 6A, the music reproduction image and a photo reproduction image as illustrated in FIG. 6B, and the photo reproduction image as illustrated in FIG. 6C.

It is understood that according to aspects of the present invention, the user may manually control a starting position of the indicator 610 such that the user can, therefore, control the position of a corresponding application image. Furthermore, it is understood that according to aspects of the present invention, each application can have a corresponding indicator, and each indicator can be in a different starting location on the touchscreen such that each application image can be positioned differently on the touchscreen.

Figure 7:
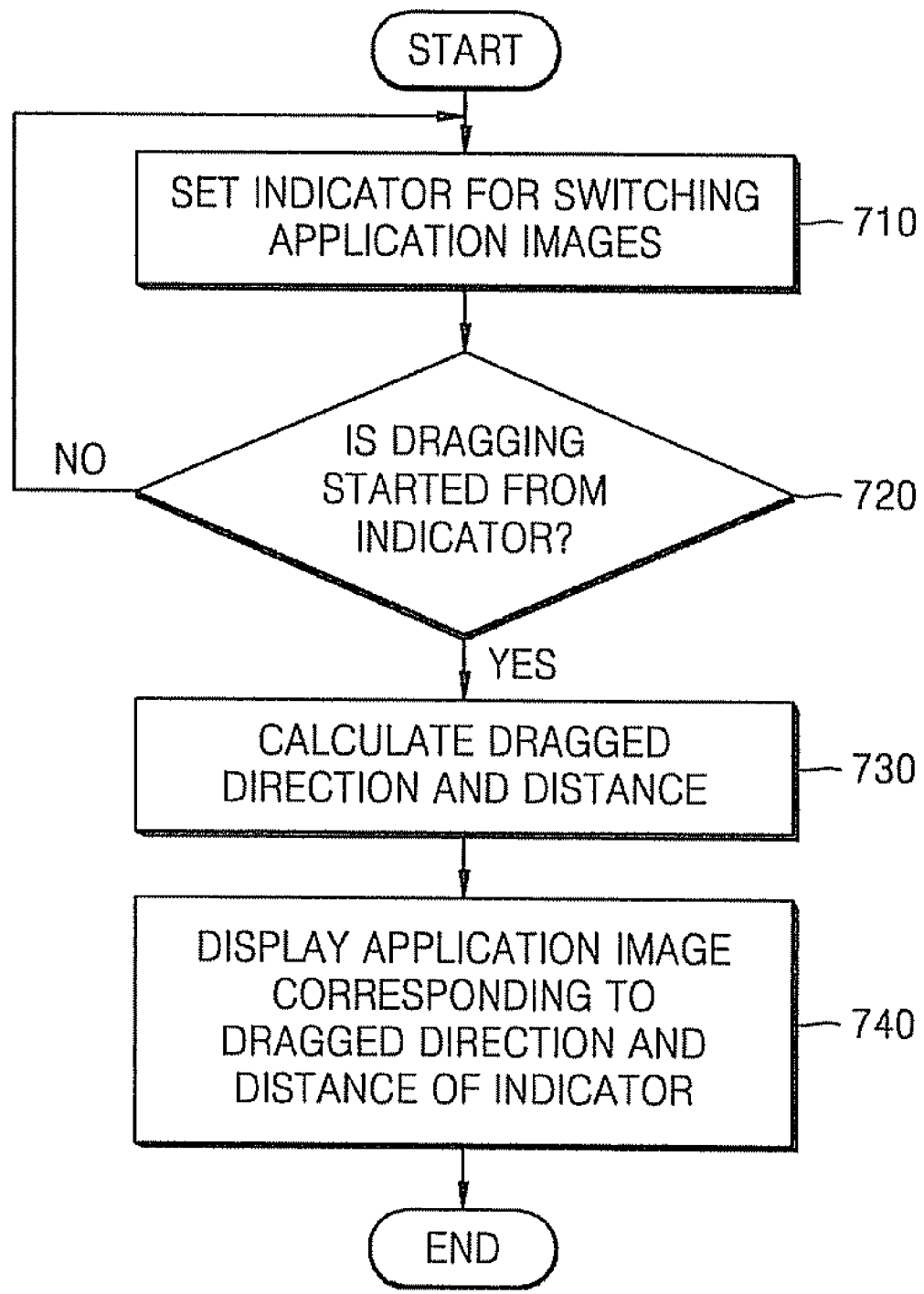
FIG. 7 is a flowchart of a method of switching between applications by dragging an indicator on a touchscreen illustrated in FIGS. 5A and 5B and FIGS. 6A through 6C, according to an embodiment of the present invention.

FIG. 7 is a flowchart of a method of switching application images by dragging an indicator on the touchscreen illustrated in FIGS. 5A and 5B and FIGS. 6A through 6C, according to an embodiment of the present invention. Referring to FIG. 7, an indicator is set in order to switch a first application image currently being displayed on the touchscreen to a second application image, different from the first application image, in operation 710. The indicator may be set at a predetermined region on the top or the bottom of the touchscreen and may be connected (i.e., correspond) to the first application image.

It is then determined whether a drag touching, starting from the indicator is sensed in operation 720. If the drag touching is sensed (operation 720), a dragging direction and distance (or degrees of movement) are calculated in operation 730.

A second application image connected (i.e., corresponding) to the indicator is overlaid on the first application image in accordance with the dragged direction and distance of the drag touching starting from the indicator in operation 740. As a result, a user may operate functions of an application image displayed on the touchscreen in accordance with the dragging of the indicator.

Aspects of the present invention can also be embodied as computer-readable codes on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, and a computer data signal embodied in a carrier wave comprising a compression source code segment comprising the code and an encryption source code segment comprising the code (such as data transmission through the Internet). The computer-readable recording medium can also be distributed over network-coupled computer systems so that the computer-readable code is stored and executed in a distributed fashion. Aspects of the present invention may also be realized as a data signal embodied in a carrier wave and comprising a program readable by a computer and transmittable over the Internet.

As described above, according to aspects of the present invention, audio volume may be controlled without viewing a touchscreen, by tapping an image of the touchscreen. Also, multiple tasks may be performed on the touchscreen at the same time by displaying a plurality of application images on the touchscreen by dragging an indicator.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method for a touchscreen based user interface (UI) interaction, the method comprising:
   displaying an application image on a touchscreen;
   sensing whether the touchscreen is touched on the displayed application image;
   displaying a volume image to control an audio volume at a touch position if the touchscreen is touched; and
   changing a size of the volume image if the touchscreen is touched and controlling the audio volume to correspond to the size of the volume image.

2. The method as claimed in claim 1, wherein the displaying of the volume image comprises:
   overlaying the volume image on the application image at the touch position.

3. The method as claimed in claim 2, wherein the volume image has a circular shape.

4. The method as claimed in claim 1, wherein the changing of the size of the volume image comprises:
   sensing whether the touchscreen is touched in an inside of the volume image or an outside of the volume image;
   increasing the size of the volume image when the touchscreen is touched in the inside of the volume image; and
   decreasing the size of the volume image when the touchscreen is touched in the outside of the volume image.

5. The method as claimed in claim 1, wherein the changing of the size of the volume image comprises:
   sensing a dragged touch on the touchscreen;
   controlling the audio volume according to an angle of the dragged touch.

6. The method as claimed in claim 1, wherein the changing of the size of the volume image comprises:
   controlling the audio volume according to an amount of time the volume image is continuously touched.

7. The method as claimed in claim 1, further comprising:
   removing the volume image from the touchscreen if the touchscreen is not touched for a predetermined period of time.

8. A non-transitory computer readable recording medium storing computer readable program code that, when executed by a computer, implements the method of claim 1.

9. A multimedia terminal device comprising:
   a touchscreen unit to display an application image and to display a volume image that corresponds to an audio volume of the device; and
   a control unit to display the volume image at a touch position when the touchscreen unit is touched on the application image, to change a size of the volume image whenever the touchscreen unit is touched, and to control the audio volume so as to correspond to the size of the volume image.

10. The device as claimed in claim 9, further comprising:
    a memory unit to store digital multimedia contents and predetermined volume information corresponding to a plurality of operation modes.

11. The device as claimed in claim 9, wherein the control unit senses whether the touchscreen unit is touched in an inside of the volume image or an outside of the volume image, increases the size of the volume image when the touchscreen unit is touched in the inside of the volume image, and decreases the size of the volume image when the touchscreen is touched in the outside of the volume image.

12. The device as claimed in claim 9, wherein the control unit senses a dragged touch on the touchscreen and controls the audio volume according to an angle of the dragged touch.

13. A method for a touchscreen based user interface (UI) interaction on a processing device, the method comprising:
    sensing whether a touchscreen of the processing device is touched;
    displaying a function image to control a function of the processing device at a touch position if the touchscreen is touched; and
    changing a size of the function image if the touchscreen is touched and controlling the function according to the size of a volume image, the changing of the size of the function image including:
    sensing whether the touchscreen is touched in an inside of the function image or an outside of the function image;
    increasing the size of the function image when the touchscreen is touched in the inside of the function image; and
    decreasing the size of the function image when the touchscreen is touched in the outside of the function image.

14. The method as claimed in claim 13, further comprising:
    displaying an application image on a touchscreen of the processing device,
    wherein the displaying of the function image comprises overlaying the function image on the application image if the touchscreen is touched.

15. The method as claimed in claim 13, wherein the changing of the size of the function image comprises:
    sensing a dragged touch on the touchscreen; and
    controlling the function according to an angle of the dragged touch.

16. A non-transitory computer readable recording medium storing computer readable program code that, when executed by a computer, implements the method of claim 13.

* * * * *